(12) United States Patent
Yamada

(10) Patent No.: US 8,410,841 B2
(45) Date of Patent: Apr. 2, 2013

(54) INPUT/OUTPUT CIRCUIT

(75) Inventor: Susumu Yamada, Moriguchi (JP)

(73) Assignee: Semiconductor Components Industries, LLC., Phoenix, AZ (US)

( * ) Notice: Subject to any disclaimer, the term of this patent is extended or adjusted under 35 U.S.C. 154(b) by 0 days.

(21) Appl. No.: 13/238,664

(22) Filed: Sep. 21, 2011

(65) Prior Publication Data

US 2012/0007655 A1 Jan. 12, 2012

Related U.S. Application Data

(63) Continuation of application No. 12/893,595, filed on Sep. 29, 2010.

(30) Foreign Application Priority Data

Sep. 29, 2009 (JP) ................... 2009-224992

(51) Int. Cl.
*H03K 17/687* (2006.01)
*H03K 17/00* (2006.01)
(52) U.S. Cl. .................... 327/427; 327/365; 326/68
(58) Field of Classification Search .................. None
See application file for complete search history.

(56) References Cited

U.S. PATENT DOCUMENTS

| 3,631,400 A | * | 12/1971 | Dervan et al. ............. 326/104 |
| 4,906,867 A | * | 3/1990 | Petty ......................... 326/27 |
| 5,371,424 A | | 12/1994 | Quigley et al. |
| 5,726,587 A | | 3/1998 | Ratner |
| 6,215,339 B1 | * | 4/2001 | Hedberg ..................... 327/108 |
| 6,239,617 B1 | | 5/2001 | Guertin et al. |
| 6,366,122 B1 | | 4/2002 | Krishnamurthy et al. |
| 7,884,648 B2 | * | 2/2011 | Broyde et al. ............. 326/86 |

FOREIGN PATENT DOCUMENTS

JP 2005-020268 A 1/2005

* cited by examiner

*Primary Examiner* — Crystal L Hammond
(74) *Attorney, Agent, or Firm* — Westerman, Hattori, Daniels & Adrian, LLP

(57) ABSTRACT

In some embodiments, an input/output (I/O) circuit sends and receives a high-level signal and a low-level signal via a coupling capacitance provided on a communication line. The I/O circuit includes a receiving portion including a first detection circuit arranged to detect one of the signals and a second detection circuit arranged to detect the other signal, a transmitting portion including a three-value output circuit configured to output one of signals consisting of a high-level signal, a low-level signal, and a high impedance signal, and a control circuit configured to control the receiving portion and the transmitting portion. The control circuit judges a level of an inputted signal depending on detection results of the first detection circuit and the second detection circuit in a receiving state and controls an output value of the three-value output circuit in a transmitting state.

8 Claims, 4 Drawing Sheets ated Applications

This application is a continuation application of U.S. Ser. No. 12/893,595, filed Sep. 29, 2010, and is based upon and claims priority under 35 U.S.C. §119 to Japanese Patent Application No. 2009-224992 filed on Sep. 29, 2009, the entire disclosure of which is incorporated herein by reference in its entirety.

BACKGROUND OF THE INVENTION

1. Field of the Invention

Some preferred embodiments of the present invention relate to an input/output circuit (I/O circuit), and, more specifically to a communication I/O interface capable of reducing power consumption.

2. Description of the Related Art

The following description sets forth the inventor's knowledge of related art and problems therein and should not be construed as an admission of knowledge in the prior art.

In recent years, considering environments, electronic products are required to be operated at a low power consumption rate. In a capacity-coupled type communication device commonly used in a signal I/O circuit arranged between ICs mounted in an electronic product, the power consumption can be roughly classified into a power consumption of the interface portion and a power consumption of the data processing portion. Between these portions, the interface portion performing analog operations consumes most of the power, whereas the power consumption of the data processing portion constituted by digital circuits is relatively small. For this reason, in order to reduce the entire power consumption, it is effective to reduce the power consumption of the interface portion. Japanese Unexamined Laid-open Patent Application Publication No. 2005-20268 describes a signal I/O circuit using a comparator.

FIG. 4 shows a schematic structure of a conventional signal I/O circuit. In this case, a signal from a transmitter 1 is received by a coupling capacitance 2. When the coupling capacitance 2 is charged in an H-level, it means that an H-level signal was transmitted from the transmitter 1. On the other hand, when the coupling capacitance 2 is charged in an L-level, it means that an L-level signal was transmitted from the transmitter 1. This type is generally referred to as a "capacity-coupled type." At this time, the communication line L connected to the coupling capacitance 2 in series is biased at a certain voltage. The biased voltage is compared with a reference voltage Vref by a comparator 4 mounted in a receiving portion 3, whereby it is judged whether the signal transmitted form the transmitter 1 is an H-level signal or an L-level signal. The comparison result will be outputted to a data processing portion 5 as an output signal.

In this case, the comparator 4 functions as a detector. Thus, the comparator 4 is always biased at a midpoint potential and constantly consumes a power to follow the changes of the input signal to judge the signal level.

However, in a conventional I/O circuit, as mentioned above, an electric current constantly flows through the comparator to follow the changes of the input signal to judge the signal level. This constant electric flow flowing through the comparator causes a large amount of power consumption.

Under the circumstances, considering environments, in recent yeas, an I/O circuit of this kind is required to reduce power consumption as low as possible.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a signal I/O circuit low in power consumption or capable of minimizing power consumption.

According to a first aspect of the present invention, among other potential advantages, some embodiments can provide an input/output circuit for sending and receiving a high-level signal and a low-level signal via a coupling capacitance provided on a communication line. The input/output circuit includes a receiving portion including a first detection circuit (detector) arranged to detect one of the high-level signal and the low-level signal and a second detection circuit (detector) arranged to detect the other of the high-level signal and the low-level signal, a transmitting portion including a three-value output circuit configured to output one of signals consisting of a high-level signal, a low-level signal, and a high impedance signal, and a control circuit configured to control the receiving portion and the transmitting portion. The control circuit judges a level of an inputted signal depending on detection results of the first detection circuit and the second detection circuit in a receiving state and controls an output value of the three-value output circuit in a transmitting state.

In some examples, it can be configured such that in a receiving state, when the high-level signal is detected, the control circuit makes the first detection circuit and the second detection circuit turn off and turn on, respectively, and wherein, when the low-level signal is detected, the control circuit makes the first detection circuit and the second detection circuit turn on and turn off, respectively.

In some examples, it can be configured such that in a transmitting state, when the high-level signal is detected, the control circuit makes the three-value output circuit output a high-level signal, and when the low-level signal is detected, the control circuit makes the three-value output circuit output a low-level signal.

In some examples, it can be configured such that the control circuit includes a register, and the control circuit makes the three-value output circuit active or inactive depending a value of the register.

In some examples, it can be configured such that the first detection circuit includes a first P-type channel transistor, a first resister, and a first N-type channel transistor connected in series in this order from a power source line between the power source line and a ground, a gate of the first N-type channel transistor is connected to the communication line, a first on-off control signal for changing an on-off state of the first P-type channel transistor outputted from the control circuit is inputted to a gate of the first P-type channel transistor, and a first detection signal is outputted from a connecting portion of the first resister and the first N-type channel transistor to the control circuit, and that the second detection circuit includes a second P-type channel transistor, a second resister, and a second N-type channel transistor connected in series in this order from the power source line between the power source line and the ground, a gate of the second P-type channel transistor is connected to the communication line, a second on-off control signal for changing an on-off state of the second N-type channel transistor outputted from the control circuit is inputted to a gate of the second N-type channel transistor, and a second detection signal is outputted from a connecting portion of the second P-type channel transistor and the second resister to the control circuit.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the present invention will be described by way of example and not limitation. It should be understood based on this disclosure that various other modifications can be made by those in the art based on these illustrated embodiments.

Hereinafter, some preferable embodiments of the present invention will be explained with reference to the attached drawings.

Figure 1:
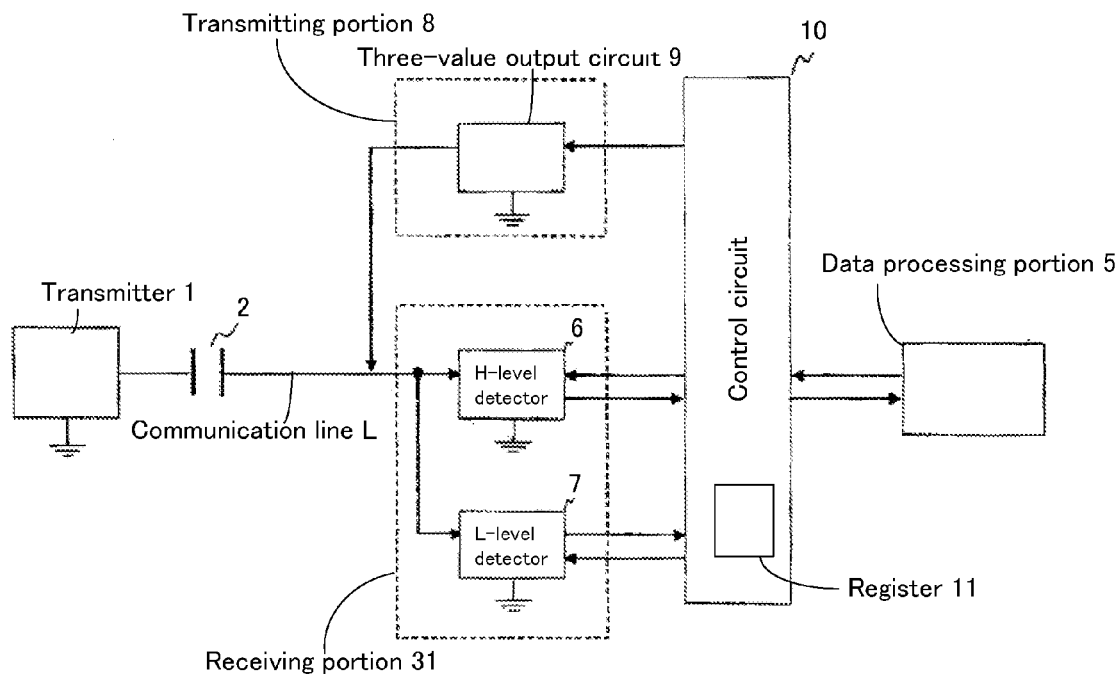
FIG. 1 is a schematic structural view showing a signal I/O circuit according to a first embodiment.

FIG. 1 is a schematic structural view of a signal input/output circuit (I/O circuit) according to an embodiment of the present invention. In FIG. 1, the reference numeral "1" denotes a transmitter, "2" denotes a coupling capacitance, "5" denotes a data processing portion, "8" denotes a transmitting portion, "10" denotes a control circuit, and "31" denotes a receiving portion.

The receiving portion 31 includes an H-level detector 6 and an L-level detector 7. The H-level detector 6 is a detector configured to detect a change of the signal level of the input signal outputted from the transmitter 1 from an L-level to an H-level. In the same manner, the L-level detector 7 is a detector configured to detect a change of the signal level of the input signal outputted from the transmitter 1 from an H-level to an L-level. Each of the H-level detector 6 and the L-level detector 7 is a detector arranged to detect one of the signal level changes from one level to the other level or the other level to the one level.

The transmitting portion 8 is arranged to control the potential of the communication line L and includes a three-value output circuit 9. The three-value output circuit 9 can output any one of three level signals, i.e., an L-level signal, an H-level signal, and a high impedance signal, and controlled by the control circuit 10. The three-value output circuit 9 normally outputs a high impedance signal when the transmitting portion 8 is not in use, i.e., in a receiving state. When it is required that the communication line L is set to be in an L-level, the three-value output circuit 9 outputs an L-level signal. When it is required that the communication line L is set to be in an H-level, the three-value output circuit 9 outputs an H-level signal. In a receiving state, the control circuit 10 detects the level of the input signal transmitted from the transmitter 1 using the receiving portion 31.

Figure 2:
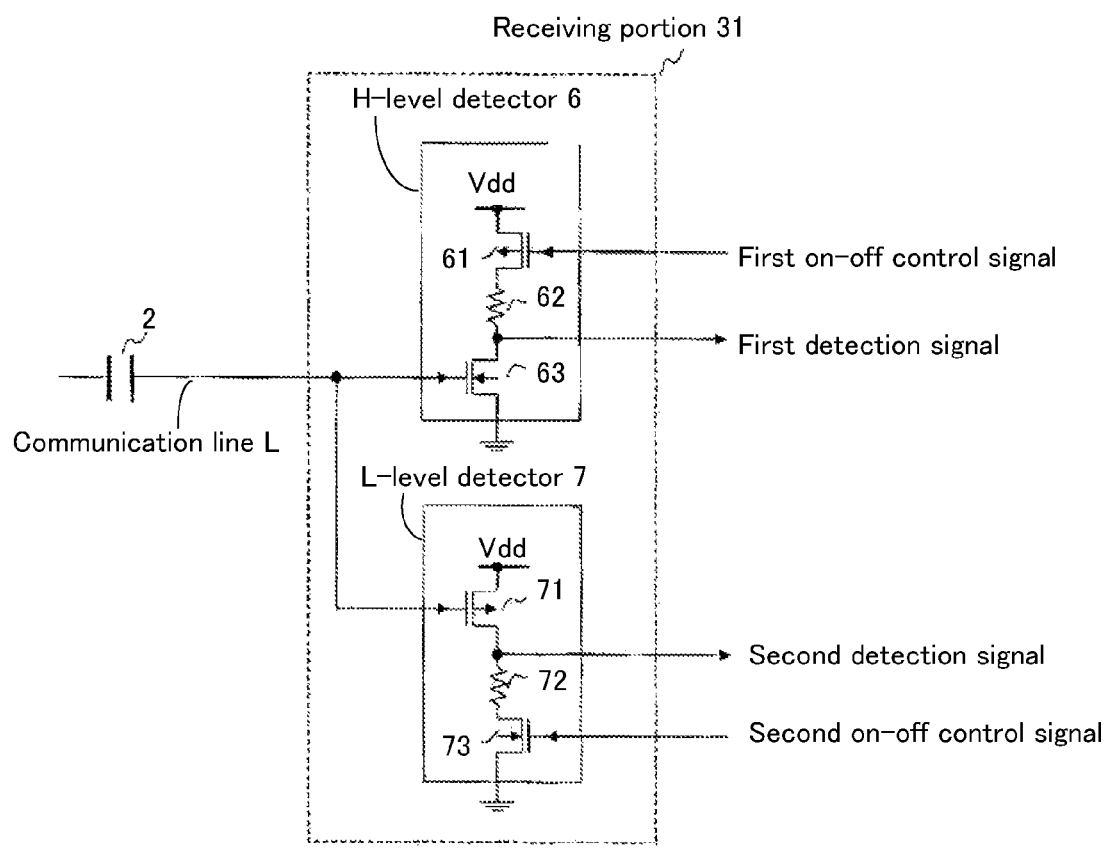
FIG. 2 is an example of an H-level detector and an L-level detector of the signal I/O circuit shown in FIG. 1.

FIG. 2 shows one example of the H-level detector and the L-level detector shown in FIG. 1. In the H-level detector 6, between the power source line and the ground, a P-type channel transistor 61, a resistor 62, and an N-type channel transistor 63 are connected in series in this order from the power source line. A first on-off control signal from the control circuit 10 is inputted to a gate of the P-type channel transistor 61. According to the need, the on-off state of the H-level detector 6 can be controlled. A first detection signal is taken out from the connecting portion of the resistor 62 and the N-type channel transistor 63 to be outputted to the control circuit 10. An input signal inputted from the communication line L is applied to the gate of the N-type channel transistor 63.

When the H-level detector 6 is in an ON-state, an L-level control signal is applied to the gate of the P-type channel transistor 61 from the control circuit 10. In this state, if an L-lever input signal is inputted to the gate of the N-type channel transistor 63, the transistor 63 turns off. Therefore, in the H-level detector 6, no current flows between the power source and the ground since the power source and the ground are shut off. In this state, the H-level detector 6 is not operated, and consumes no power. At this state, the first detection signal is in a pulled-up state and the H-level is maintained.

At this time, when the input signal changes to an H-level, the gate of the N-type channel transistor 63 becomes in a H-level, turning on the N-type channel transistor 63, which causes a flow of an electric current between the power source and the ground. As a result, the first detection signal is outputted as a voltage defined by the ratio of an additional value of the turn-on resistance of the P-type channel transistor 61 and the resistance of the resistor 62 to the turn-on value of the N-type channel transistor 63 with respect to the power supply voltage Vdd. Since the resistance value of the resistor 62 is sufficiently larger than the turn-on resistance value of the transistor, the detection signal becomes almost the ground level. Thus, the first detection signal changes from the H-level to the L-level, and the control circuit 10 which received the signal change can detect that the communication line L has changed from the L-level to the H-level.

In the L-level detector 7, between the power source line and the ground, a P-type channel transistor 71, a resistor 72, and an N-type channel transistor 73 are connected in series in this order from the power source line. A second on-off control signal from the control circuit 10 is inputted to a gate of the N-type channel transistor 73. According to the need, the on-off state of the L-level detector 7 can be controlled. A second detection signal is taken out from the connecting portion of the resistor 72 and the P-type channel transistor 71 to be outputted to the control circuit 10.

An input signal inputted from the communication line L is applied to the gate of the P-type channel transistor 71. When the L-level detector 7 is in an ON-state, an H-level control signal is applied to the gate of the N-type channel transistor 73 from the control circuit 10. In this state, if an H-lever input signal is inputted to the gate of the P-type channel transistor 71, the transistor 71 turns off. Therefore, in the L-level detector 7, no current flows between the power source line and the ground since the power source line and the ground are shut off. In this state, the L-level detector 7 is not operated, and therefore no power is consumed. At this state, the first detection signal is in a pulled-down state and the L-level is maintained.

At this time, when the input signal from the transmitter 1 changes from the H-level to an L-level, the gate of the P-type channel transistor 71 becomes in an L-level, turning on the P-type channel transistor 71, which causes a flow of an electric current between the power source line and the ground. As a result, the second detection signal is outputted as a voltage defined by the ratio of an additional value of the turn-on resistance of the P-type channel transistor 71 and the resistance of the resistor 72 to the turn-on resistance value of the N-type channel transistor 73 with respect to the power supply voltage Vdd. Since the resistance value of the resistor 72 is sufficiently larger than the turn-on resistance value of each transistor, the detection signal becomes almost the power source voltage Vdd level. Thus, the second detection signal changes from the H-level to the L-level, and the control circuit 10 which received the signal change can detect that the communication line L has changed from the H-level to the L-level.

As explained above, by using two detectors 6 and 7, or the H-level detector 6 and the L-level detector 7, it becomes possible to detect the signal level change of the communication line L, or from an L-level to an H-level and from an H-level to an L-level. Furthermore, in this embodiment, it is configured such that no electric current flows through each of the detectors until they detect the signal level change of the communication line L. Further, the operation of both the detectors 6 and 7 in a complimentary manner enables to cut the power consumption to zero except during the signal level changes on the communication line L.

Immediate changing the ON/OFF state of the H-level detector 6 and that of the L-level detector 7 can attain almost zero electric current flow through each detector. As a result, even if the communication is continuously performed for a long period of time, the power consumption can be approached to almost zero.

Figure 3:
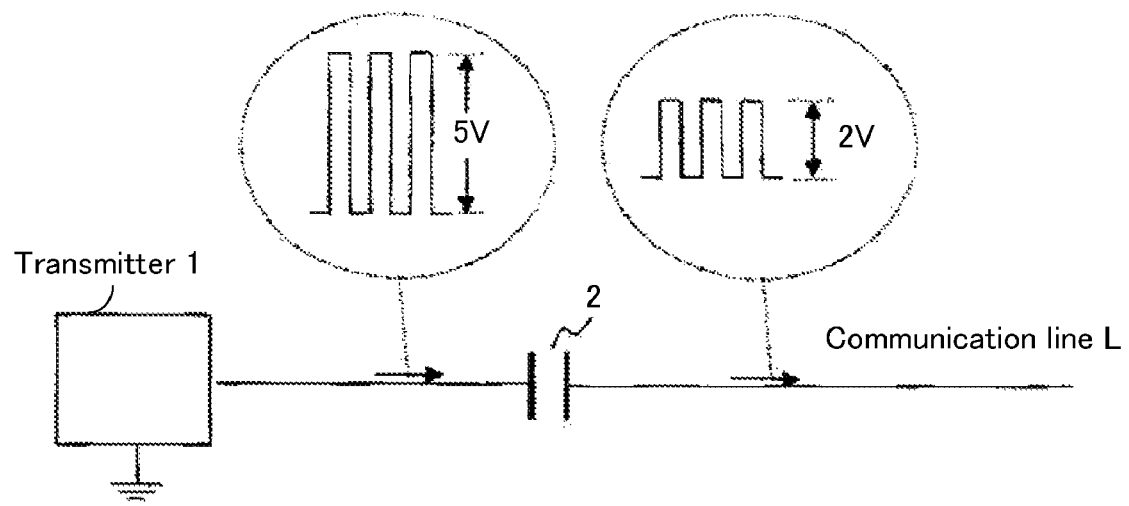
FIG. 3 shows attenuation of the amplitude of an input signal by a coupling capacitance.
Figure 4:
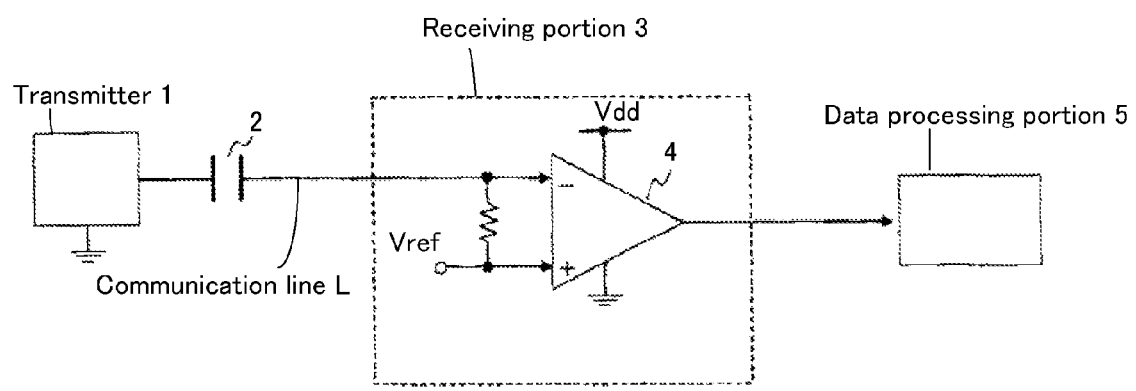
FIG. 4 is a schematic structural view showing a conventional signal I/O circuit.

FIG. 3 shows that the amplitude of the signal outputted from the transmitter 1 attenuates when the signal is received by the coupling capacitance 2 on the communication line L. Due to the attenuation, even if the signal from the transmitter 1 has an amplitude of about 5 V, the amplitude may sometimes attenuate to, e.g., about 2 V when the signal passes through the coupling capacitance 2. Such a voltage having an amplitude of about 2 V is a halfway potential for both the H-level detector 6 and the L-level detector 7, and may cause false detections of the detectors.

For example, if the attenuated signal is changed from an L-level to an H-level (e.g., 0 V to 2 V), the H-level detector 6 may detect a signal level change from an L-level to an H-level even if the change is about 2 V. In this state, however, if the detector is changed to the H-level detector 6 and the L-level detector 7 is operated, the L-level detector 7 erroneously judges that the 2 V is an L-level.

To solve the problem, in this embodiment, it is configured such that the control circuit 10 do not turn on the L-level detector 7 immediately after the detection of the H-level by the H-level detector 6, and makes the three-value output circuit 9 output a sufficiently high H-level signal (e.g., Vdd level signal) to supplement the attenuated signal. By outputting the sufficiently high H-level signal (e.g., Vdd level) from the three-value output circuit 9, the electric potential of the communication line L can be raised from the halfway voltage of 2 V to the power source voltage Vdd (5 V). After pulling up the potential of the communication line L to the power source voltage Vdd (5 V), the control circuit 10 changes the output of the three-value output circuit 9 from the H-level to a high impedance state to turn on the L-level detector 7. In this state, since the communication line L is maintained at a sufficiently high H-level, the L-level detector 7 does not make an erroneous decision.

Furthermore, when the signal level of the input signal is changed from an H-level to an L-level, in some cases, the signal level changes, for example, not from 5 V to 0 V, but from 5 V to 3 V due to the attenuation by the coupling capacitor 2. In this instance, if the level detector is changed to the L-level detector 7 and the H-level detector 6 is activated, the H-level detector 6 will erroneously judge that the 3 V is an H-level. To solve the problem, in this embodiment, it is configured such that the control circuit 10 do not turn on the H-level detector 6 immediately after the detection of the level change from an H-level to an L-level, and makes the three-value output circuit 9 output a sufficiently low L-level signal (e.g., ground level) to supplement the attenuated signal. By outputting the sufficiently low L-level signal (e.g., ground level) from the three-value output circuit 9, the electric potential of the communication line L can drop from the halfway voltage of 3 V to 0 V. By turning on the H-level detector 6 after pulling down the potential of the communication line L to the ground level, it becomes possible to detect the signal level change from an L-level to an H-level even if the signal level change is from 0 V to 2 V.

As explained above, even in the receiving state, by utilizing the three-value output circuit 9 of the transmitting portion 8, the accuracy of detecting the signal level changes from an H-level to an L-level, and from an L-level to an H-level, can be enhanced even if the signal level is attenuated by the coupling capacitance 2.

The aforementioned explanation is directed to an example in which the potential of 5 V in amplitude is attenuated to a potential of 2 V in amplitude. It should be understood, however, that there is no need to use the three-value output circuit 9 of the transmitting portion 8 if the signal outputted from the transmitter 1 is sufficiently large such that the signal has a sufficiently large amplitude (e.g., about 5 V) even after the attenuation by the coupling capacitance 2. Accordingly, the efficiency can be further improved by constituting such that whether or not the three-value output circuit 9 of the transmitting portion 8 should be used is decided based on the amplitude of the signal outputted from the transmitter 1. This kind of the signal I/O circuit explained above is often embedded in a microcomputer as a peripheral circuit, and the control circuit has a register 11 which performs settings on whether or not the three-value circuit 9 of the transmitting portion 8 is to be utilized. Accordingly, if it is configured such that the setting of the register 11 can be rewritten by the program of the microcomputer, the usability can be further improved.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. An input/output circuit for sending and receiving a high-level signal and a low-level signal via a coupling capacitance provided on a communication line,
the input/output circuit comprising:
a receiving portion including a first detection circuit arranged to detect one of the high-level signal and the low-level signal and a second detection circuit arranged to detect the other of the high-level signal and the low-level signal;
a transmitting portion including a three-value output circuit configured to output one of a plurality of signals consisting of a high-level signal, a low-level signal, and a high impedance signal; and
a control circuit configured to control the receiving portion and the transmitting portion, wherein the control circuit judges a level of an inputted signal depending on detection results of the first detection circuit and the second detection circuit in a receiving state and controls an output value of the three-value output circuit in a transmitting state.

2. The input/output circuit as recited in claim 1, wherein, in the receiving state, when the high-level signal is detected, the control circuit makes the first detection circuit and the second detection circuit turn off and turn on, respectively, and wherein, when the low-level signal is detected, the control circuit makes the first detection circuit and the second detection circuit turn on and turn off, respectively.

3. The input/output circuit as recited in claim 1, wherein, in the receiving state, the control circuit 10 makes the three-value output circuit output the high impedance signal.

4. The input/output circuit as recited in claim 1, wherein, in the transmitting state, when the high-level signal is detected, the control circuit makes the three-value output circuit output a high-level signal, and when the low-level signal is detected, the control circuit makes the three-value output circuit output a low-level signal.

5. The input/output circuit as recited in claim 1, wherein the control circuit includes a register, and the control circuit makes the three-value output circuit active or inactive depending a value of the register.

6. The input/output circuit as recited in claim 1, wherein the first detection circuit is an H-level detector, and the second detection circuit is an L-level detector.

7. The input/output circuit as recited in claim 1, wherein
the first detection circuit includes a first P-type channel transistor, a first resister, and a first N-type channel transistor connected in series in this order from a power source line between the power source line and a ground,
a gate of the first N-type channel transistor is connected to the communication line,
a first on-off control signal for changing an on-off state of the first P-type channel transistor outputted from the control circuit is inputted to a gate of the first P-type channel transistor, and a first detection signal is outputted from a connecting portion of the first resister and the first N-type channel transistor to the control circuit, and wherein
the second detection circuit includes a second P-type channel transistor, a second resister, and a second N-type channel transistor connected in series in this order from the power source line between the power source line and the ground,
a gate of the second P-type channel transistor is connected to the communication line,
a second on-off control signal for changing an on-off state of the second N-type channel transistor outputted from the control circuit is inputted to a gate of the second N-type channel transistor, and
a second detection signal is outputted from a connecting portion of the second P-type channel transistor and the second resister to the control circuit.

8. The input/output circuit as recited in claim 1, wherein the input/output circuit is a communication interface circuit arranged between ICs.

* * * * *